Jan. 24, 1956
F. C. PARADISE
2,732,171
HAND VALVE
Filed Feb. 24, 1953
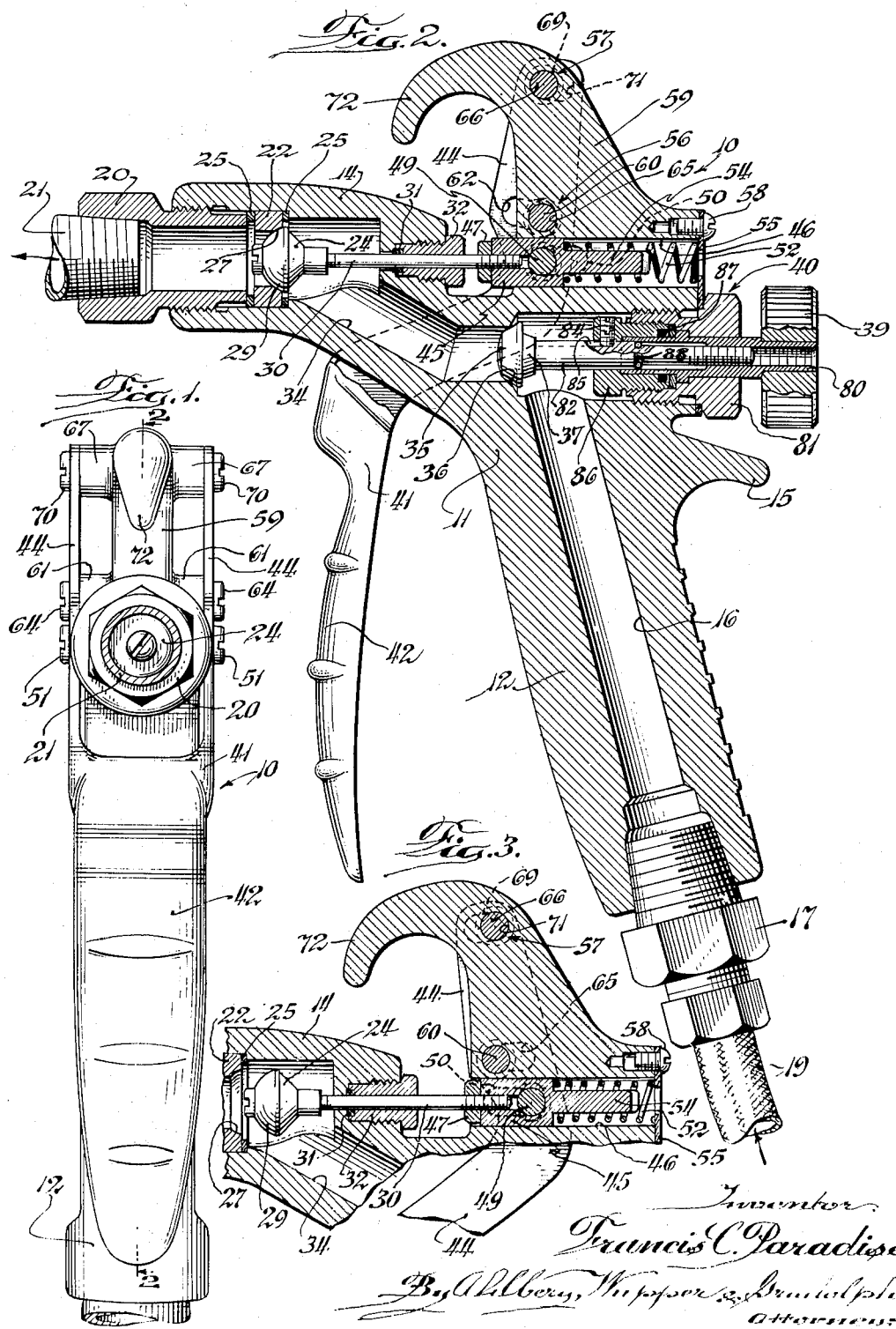

United States Patent Office 2,732,171
Patented Jan. 24, 1956

2,732,171

HAND VALVE

Francis C. Paradise, Libertyville, Ill., assignor to Stewart-Warner Corporation, Chicago, Ill., a corporation of Virginia Application February 24, 1953, Serial No. 338,327

1 Claim. (Cl. 251—233)

The present invention relates to light weight valves adapted to be supported in one hand of the user and operated by squeezing a grip lever to control the flow of high pressure lubricants and the like.

One object of the invention is to provide an improved hand valve of a sturdy, exceptionally economical construction that includes an operating linkage which minimizes the gripping force the operator must exert to completely open the valve from fully closed position against the reaction of internal fluid pressure.

Other objects and advantages will become apparent from the following description of the exemplary form of the invention shown in the drawing, in which:

Figure 1 is a front view of a valve embodying the invention;

Fig. 2 is a sectional view taken generally along line 2—2 of Fig. 1 and showing the valve in closed position; and Fig. 3 is a fragmentary sectional view showing the structure appearing in the upper portion of Fig. 2, the parts being illustrated in the open position of the valve.

The illustrated hand valve 10 comprises a one piece pistol-shaped body 11 including a depending handle portion 12 and a forwardly projecting barrel section 14. A rearwardly projecting guard 15 formed on the upper end of the handle 12 is adapted to rest between the thumb and index finger of the user's hand when gripping the handle.

A fluid passageway 16 extends upwardly through the handle 12 from the lower end thereof, which is threaded to receive a coupling 17 adapted to be connected to a hose 19 leading from a source of pressurized lubricant (not shown). Continuing through the central portion of the body 11, the passageway 16 extends out through the end of the barrel 14 which is threaded to receive a second coupling 20 adapted to be connected to a conventional nozzle member 21 adapted to direct lubricant from the valve into pressure grease fittings (not shown).

The valve 10 is closed and opened by the coaction of a valve seat 22, preferably located within the barrel 14, and a valve closure member 24 mounted on the pressure side of the seat for reverse movement into and out of engagement therewith. In this instance, the valve seat 22 is fashioned as a separate ring inserted into a seat formed medially within the barrel 14 by countersinking the outlet end of the passageway 16. There the seat ring is held tightly in place by the inner end of the previously mentioned nipple coupling 20. Two malleable sealing rings 25 interposed between opposite end faces of the valve seat 22 and the adjacent structure prevent leakage of fluid around the seat and the coupling 21.

The inner marginal edge of the seat 22 on the upstream side thereof is shaped to define a concave seating surface 27 conforming generally in curvature to an opposing convex surface 29 of the valve closure member 24. The closure member 24 is screwed onto the inner end of a stem or actuating member 30 which extends slidably through the rear end of the barrel 14. A fluid tight seal between the stem 30 and the barrel 14 is formed by packing 31 held in place by a gland 32.

Upon closure of the valve the closure member 24 is held tightly against the valve seat surface 27 by high pressure fluid in the rear portion of the barrel 14 thus making the valve difficult to open. The full force of the high pressure fluid acting on the back side of the closure member 29 must be overcome to lift this member from its seat. However, once the closure member 24 has been unseated sufficiently to permit an initial flow of fluid between the opposing surfaces 27 and 29 of the seat 22 and the closure member the back pressure of the fluid between these surfaces counteracts to a certain extent the fluid pressure on the back side of the closure member thus "unloading" the valve to a very large degree. From this point on the closure member 24 can be retracted to fully open position by a force much less than that required in the unseating action.

To minimize the work required to carry through this opening movement, special provision is made to further reduce the valve closing force of the high pressure fluid on the closure member 24 once it has been unseated. For this purpose, the portion of the fluid passageway 16 which leads into the barrel 14 is formed as an upwardly inclined throat 34 merging into the hollow barrel immediately behind the valve seat 22. Thus, as soon as the closure member 24 is lifted from its seat 22, fluid flows directly from the throat 34 into the outlet end of the barrel 16 ahead of the closure member. This flow of fluid from the side of the barrel 14 across the forward surface of the closure member 24 acts rearwardly on this movable control element while at the same time relieving the fluid pressure on the rear of the control member.

At this point it is fitting to mention that the drop in fluid pressure behind the closure member 24 incident to unseating this member is accentuated by the flow limiting action of an auxiliary valve 35 in the body 11 interposed in the passageway 16 between the handle section thereof and the throat 34. By preadjusting this auxiliary valve the user can determine the rate at which fluid will flow through the passageway 16 when the closure member 24 is open. This serves as an aid in judging the volume of lubricant discharged from the time the main valve is open. Actually the user may open and close the main valve several times in succession to eject "shots" of lubricant which together amount to the total quantity needed, the user having learned to estimate the volume of each "shot."

Briefly the auxiliary valve 35 comprises a seat 36 and a coacting head 37. The position of the head 37 is adjusted in relation to the seat 36 by turning a knob 39 on the rear end of an adjusting assembly 40 threaded into the valve body 10 at the upper end of the handle section 12. This assembly 40, which may be of any suitable construction, is designed to transform rotational movement of the knob 39 into linear adjustment of the head 37. As shown, the assembly 40 includes an internally threaded spindle 80 extending forwardly from the knob 39 through a mounting sleeve 81 to threadably receive the rear end of a stem 82 which support the head 37. This support stem is prevented from rotating by a screw 84 that extends radially into a longitudinal slot 85 in the stem from a gland 86 threaded into the inner end of the sleeve 81 to retain annular seals 87 against a radial flange on the spindle 80. An O-ring 88 forms a seal between the stem 82 and the spindle 80.

The valve closure member 24 is opened by a grip lever 41 pivotally interconnected with the valve stem 30 and including a handle portion 42 extending downwardly in front of the handle 12 to be squeezed by the operator's hand which grasps the handle 12. The grip lever 41 is forked just above the handle 42 to form two generally parallel arms 44 which extend upwardly along opposite sides of the valve body 11. As shown, the arms 44 are reversely curved to first run rearwardly and then turn upwardly over the handle 12 to extend above the axis of the valve stem 30. The arms 44 are pivotally connected to the valve stem 30 through a slide 45 slidably disposed within a channel 46 formed in the valve body 11 above the handle 12 in axial alignment with the stem 30. The rear end of the stem 30 is threaded into the forward end of the slide 45 and locked in place by a nut 47. Opposite ends of a transverse pivot pin 49 in the slide 45 project outwardly through horizontal slots 50 in the valve body 14 to extend through the opposed grip lever arms 44. The arms are retained on the pin 49 by screws threaded into opposite ends of the pin. A helical compression spring 52 encircling a stem 54 on the rear end of the slide 45 reacts at opposite ends on a cover plate 55 over the rear end of the channel 46 and on the rear of the slide to urge the closure member 24 toward the seat 22. As shown, the cover plate 55 is held in place on the rear of the valve body 11 by the auxiliary valve sleeve 81 and a screw 58.

To provide a powerful high leverage action of the grip lever 41 on the valve stem 30 to initially unseat the valve, a first separable pivotal connection 56 is provided between the grip lever and the valve body 14 just above the slide 45 to define a transverse pivotal axis for the grip lever closely adjacent the pivotal connection between the lever and the slide. The grip lever handle 42 thus has an extensive range of movement in unseating the valve which permits operation of the lever 41 by a materially reduced gripping force.

In order that the valve may be fully opened by a rather short range of permissible grip lever movement remaining after unseating of the valve, a second separable pivatal connection 57 between the upper ends of the lever arms 44 and the valve body 11 is located above the first separable pivotal connection 56 at a relatively remote distance from the projected axis of the valve stem 30. In the preferred construction shown, the distance between this second pivotal connection 57 and the pivotal connection between the grip lever 41 and the slide 30 is substantially four times that of the distance between the first pivotal connection 56 and the slide connection.

The arrangement of the two separable pivotal connections 56 and 57 between the lever 41 and the body 11 is such that immediately upon unseating of the valve closure member 24, the pivotal action of the lever 41 is shifted from the high leverage connection 56 to the low leverage connection 57 to quadruple the opening movement of the closure member for each added increment of lever movement. It will be appreciated that this shifting in leverage takes place simultaneously with the sharp "unloading" of the fluid reaction tending to close the valve.

Structurally, the two separable pivotal connections 56 and 57 between the grip lever 41 and the valve body 11 are quite simple, a noteworthy consideration from the standpoint of manufacturing costs. Both connections are formed between the upper ends of the lever arms 44 and a crown or support member 59 on the body projecting upwardly between the arms. The first pivotal connection 56 comprises a pivot pin 60 extending transversely through the crown 59, just above the slide 45, and protruding outwardly at opposite ends through short cylindrical bosses 61 to reach through generally horizontal slots 62 formed in the respective arms 44. Screws 64 threaded into opposite ends of the pin 60 prevent spreading of the arms. Opposite ends of the pivot pin 60 thus form a first pair of fulcrums which upon movement of a slide 45 into valve closed position are engaged by the structure of the arms 44 at the rear ends of the slots 62. This structure forms fulcrum seats 65 that articulate with the pivot pin fulcrums to complete the first separable pivotal connection 56.

The second separable pivotal connection 57 is generally similar to the first connection 56 and comprises a second transverse pivot pin 66 in the upper end of the crown 59. Opposite ends of the pin 66 extend outwardly through cylindrical bosses 67 to project through generally horizontal slots 69 in the upper end of the respective arms 44. Retaining screws 70 are threaded into opposite ends of the pin 66.

As illustrated in Fig. 2, the slots 69 are located in the arms 44 to extend rearwardly from the pin 66 when the slide 45 is in valve closed position, bringing the fulcrum seats 65 into engagement with the coacting fulcrum formed by opposite ends of the pin 60. Upon swinging of the grip lever 41 through an arc just sufficient to unseat the valve closure member 24, the structure of the arms 44 at the rear ends of the slots 69 engages opposite ends of a second pair of fulcrums formed by opposite ends of the pin 66. This structure serves as a second pair of fulcrum seats 71 which completes the second separable pivotal connection 57.

Upon engagement of the fulcrum seats 71 with the pin 66 the reaction of the grip lever on the valve body 14 is immediately shifted to the second connection 67, the fulcrum seat 65 of the first connection 56 being free to separate from the coacting pin 60 during continued opening movement of the lever 44.

As to further details, it may be noted that the lower arm slots 62 are slightly arcuate in shape, having a center of curvature located at the rear end of the upper slots 69. Similarly, the upper slots 69 are slightly curved with centers of curvature at the forward ends of the lower slots 62. It will be observed that the forward ends of the lower slots 62 and of the upper slots 69 serve to limit, respectively, the opening and closing movements of the grip lever 41 by engaging the adjacent pivot pins 60 and 66.

As shown, the crown 59 which serves as a fulcrum support for the grip lever 41 doubles as a support hook 72 for the valve 10, a forwardly and downwardly curved extension being provided on the upper end of the crown for this purpose.

Further, in regard to the general usefulness of the valve 10, it will be appreciated that the special features of the valve which enable it to be opened with great ease enable the user to dispense lubricant through the valve in successive "shots" without tiring of the hand even after using the valve for long periods. In this connection it will be remembered that the rate at which fluid is ejected during each "shot" can be pre-adjusted by the auxiliary valve 35.

While I have shown and described a preferred embodiment of my invention, it will be apparent that numerous variations and modifications thereof may be made without departing from the underlying principles of the invention. I therefore desire, by the following claim, to include within the scope of the invention all such variations and modifications by which substantially the results of my invention may be obtained through the use of substantially the same or equivalent means.

I claim:

A high pressure hand valve comprising, in combination, a pistol-shaped valve body including a handle portion and a barrel section, said body defining a passageway therein extending outwardly through said barrel section, a valve seat in said barrel section, a closure member movably disposed on the pressure side of said seat, a grip lever including a handle extending downwardly generally alongside said handle and a pair of arms reaching upwardly along opposite sides of said body, a slide slidably disposed within said body between said arms and connected to said closure member, means pivotally connecting said slide to said arms, a support member on said body extending upwardly between said arms, a first pair of transverse fulcrums on opposite sides of said support member, said arms defining a first pair of slots therein receiving said respective fulcrums, the structure of said arms at one end of said slots forming fulcrum seats separably engageable with said fulcrums to provide for a high leverage unseating action of said lever on said closure member, a second pair of fulcrums on said support member disposed a substantial distance above said first pair of fulcrums, said arms defining a second pair of slots receiving said respective second fulcrum, and the structure of said arms at one end of said second slots defining second fulcrum seats separably engageable with said second fulcrums to provide for low leverage continued unseating movement of said closure member beginning simultaneously upon completion of pivotal unseating movement of said lever about said first fulcrums.

References Cited in the file of this patent

UNITED STATES PATENTS

| | | |
|---|---|---|
| 555,738 | Rushton | May 3, 1896 |
| 911,379 | Collin | Feb. 2, 1909 |
| 1,883,843 | Woodford | Oct. 18, 1932 |
| 1,939,607 | Krautzberger | Dec. 12, 1933 |
| 1,969,205 | Carr et al. | Aug. 7, 1934 |

FOREIGN PATENTS

| | | |
|---|---|---|
| 465,351 | Canada | May 23, 1950 |